United States Patent
McAuliffe et al.

(10) Patent No.: US 10,155,592 B2
(45) Date of Patent: Dec. 18, 2018

(54) ENVIRONMENTAL CONTROL SYSTEM WITH AIR CYCLE MACHINE BYPASS SHUTOFF VALVES

(71) Applicant: Hamilton Sundstrand Corporation, Windsor Locks, CT (US)

(72) Inventors: Christopher McAuliffe, Windsor, CT (US); John M. Maljanian, Jr., Farmington, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 605 days.

(21) Appl. No.: 14/541,995

(22) Filed: Nov. 14, 2014

(65) Prior Publication Data
US 2015/0314877 A1 Nov. 5, 2015

Related U.S. Application Data
(60) Provisional application No. 61/988,348, filed on May 5, 2014.

(51) Int. Cl.
*B60H 1/32* (2006.01)
*B64D 13/06* (2006.01)
*F02C 6/08* (2006.01)

(52) U.S. Cl.
CPC ............. *B64D 13/06* (2013.01); *F02C 6/08* (2013.01); *B64D 2013/0618* (2013.01); *B64D 2013/0648* (2013.01)

(58) Field of Classification Search
CPC B64D 13/08; B64D 13/06; B64D 2013/0618; B64D 2013/0648; A23L 3/363; F25B 41/04; F25B 1/10; F02C 6/08

USPC .................................. 62/61, 498, 115, 196.3
See application file for complete search history.

(56) References Cited

U.S. PATENT DOCUMENTS

| | | | |
|---|---|---|---|
| 2,618,470 A * | 11/1952 | Brown ................... | B64D 13/06 165/43 |
| 5,704,218 A | 1/1998 | Christians et al. | |
| 5,784,894 A | 7/1998 | Army, Jr. et al. | |
| 5,896,828 A * | 4/1999 | Kronschnabel ......... | A01J 7/022 119/14.02 |
| 6,124,646 A | 9/2000 | Artinian et al. | |
| 6,148,622 A * | 11/2000 | Sanger ................... | B64D 13/06 62/402 |
| 6,295,822 B1 * | 10/2001 | Mueller ................. | B64D 13/06 62/172 |

(Continued)

FOREIGN PATENT DOCUMENTS

| EP | 1283165 A2 | 2/2003 |
|---|---|---|
| EP | 1386837 A1 | 2/2004 |

OTHER PUBLICATIONS

Extended European Search Report for European Application No. 15166450.5, dated Sep. 4, 2015, 7 Pages.

*Primary Examiner* — Melvin Jones
(74) *Attorney, Agent, or Firm* — Kinney & Lange, P.A.

(57) ABSTRACT

An environmental control system includes an air cycle machine. The air cycle machine includes a compressor section with a compressor inlet and a compressor outlet, and a first turbine section with a first turbine inlet and a first turbine outlet. The environmental control system further includes a first turbine bypass shutoff valve positioned at the first turbine inlet. The first turbine bypass shutoff valve is configured to shut off the flow of air to the first turbine inlet.

26 Claims, 1 Drawing Sheet

(56) References Cited

U.S. PATENT DOCUMENTS

| | | | |
|---|---|---|---|
| 6,427,471 | B1 | 8/2002 | Ando et al. |
| 8,166,755 | B2 | 5/2012 | Jeanson et al. |
| 8,347,647 | B2 | 1/2013 | McAuliffe et al. |
| 8,678,755 | B2 | 3/2014 | Lombard et al. |
| 8,684,675 | B2 | 4/2014 | Lombard et al. |
| 2011/0283713 | A1 | 11/2011 | Kelnhofer |
| 2014/0069096 | A1 | 3/2014 | Murayama |

* cited by examiner

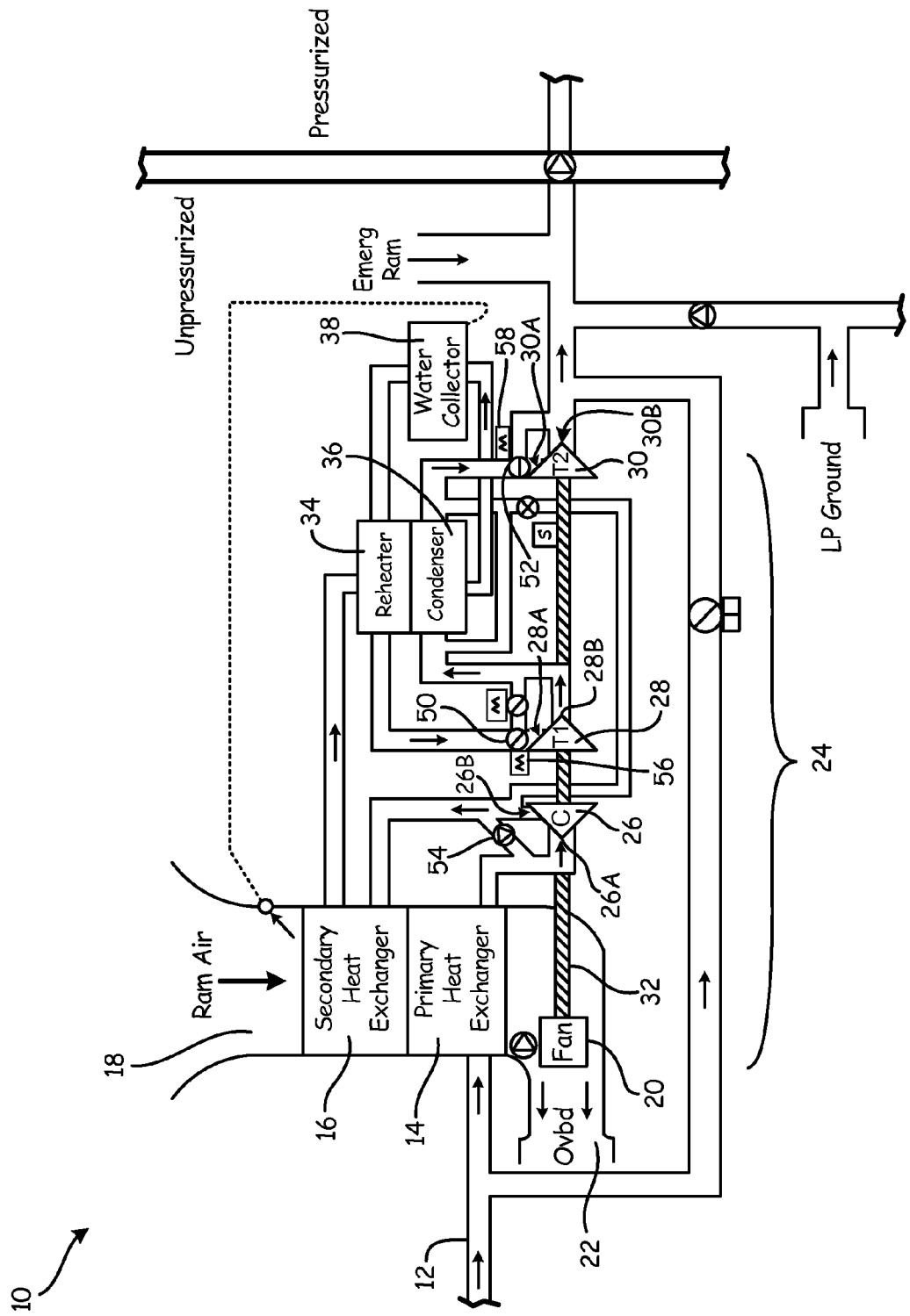

ENVIRONMENTAL CONTROL SYSTEM WITH AIR CYCLE MACHINE BYPASS SHUTOFF VALVES

CROSS-REFERENCE TO RELATED APPLICATION(S)

This application claims priority to U.S. Provisional Application No. 61/988,348, filed on May 5, 2014, and entitled "ECS with ACM Isolation Valves," the disclosure of which is incorporated by reference in its entirety.

BACKGROUND

The present disclosure relates to aircraft environmental control systems. More specifically, the present disclosure relates to an environmental control system with air cycle machine shutoff valves.

Air cycle machines are used in environmental control systems in aircraft to condition air for delivery to an aircraft cabin. Conditioned air is air at a temperature, pressure, and humidity desirable for aircraft passenger comfort and safety. At or near ground level, the ambient air temperature and/or humidity is often sufficiently high that the air must be cooled as part of the conditioning process before being delivered to the aircraft cabin. At flight altitude, ambient air is often far cooler than desired, but at such a low pressure that it must be compressed to an acceptable pressure as part of the conditioning process. Compressing ambient air at flight altitude heats the resulting pressurized air sufficiently that it must be cooled, even if the initial ambient air temperature is very low. Thus, under most conditions, heat must be removed from air by the air cycle machine before the air is delivered to the aircraft cabin.

Air cycle machines that are used in environmental control systems typically include a fan section, a compressor section, and one or more turbine sections. When either the bearings supporting the rotors or the rotors in either the compressor section or the turbine sections fail, particulate from rotor run can be released into the airstream that is being delivered to the cabin and the cockpit. This can cause a smell in the cabin and the cockpit that can cause the aircraft to make an emergency landing in order to investigate the source of the smell. This causes significant delay and cost to get each passenger to their destination via an alternate route, and it also causes significant anxiety for the passengers and crew induced by the declared emergency.

SUMMARY

An environmental control system includes an air cycle machine. The air cycle machine includes a compressor section with a compressor inlet and a compressor outlet, and a first turbine section with a first turbine inlet and a first turbine outlet. The environmental control system further includes a first turbine bypass shutoff valve positioned at the first turbine inlet. The first turbine bypass shutoff valve is configured to shut off the flow of air to the first turbine inlet.

A method of shutting off flow to a turbine section in an air cycle machine includes detecting a failure in an air cycle machine, actuating a first turbine bypass shutoff valve positioned at an inlet of a first turbine section in the air cycle machine, and shutting off a flow of air to the first turbine section in the air cycle machine.

BRIEF DESCRIPTION OF THE DRAWINGS

FIG. 1 is a schematic view of an environmental control system with an air cycle machine.

DETAILED DESCRIPTION

FIG. 1 is a schematic view of environmental control system 10 with air cycle machine 24. FIG. 1 shows environmental control system 10, air inlet 12, primary heat exchanger 14, secondary heat exchanger 16, ram air inlet 18, ran air fan 20, ram air outlet 22, air cycle machine 24, compressor 26, first turbine 28, second turbine 30, shaft 32, reheater 34, condenser 36, water collector 38, first turbine bypass shutoff valve 50, second turbine bypass shutoff valve 52, compressor bypass valve 54, actuator 56, and actuator 58.

Environmental control system 10 can be mounted in an aircraft to supply conditioned air to the aircraft cabin at the proper temperature and pressure. Air is ingested into environmental control system 10 through air intake 12 and flows through a duct to primary heat exchanger 14. A portion of the air that enters through air intake 12 can also be routed through a duct to bypass environmental control system 10. The air that enters air intake 12 can be compressed air that is bled off a gas turbine engine and/or compressed air from a dedicated cabin air compressor (not shown in FIG. 1).

Primary heat exchanger 14 is connected to secondary heat exchanger 16. Primary heat exchanger 14 and secondary heat exchanger 16 are used to cool the compressed air that flows through environmental control system 10 using cooling ram air. Ram air is pulled into environmental control system 10 through ram air inlet 18 with ram air fan 20 during operation on the group or air is forced into the system due to flight of the aircraft. The ram air flows across primary heat exchanger 14 and secondary heat exchanger 16 to cool the compressed air that flows through primary heat exchanger 14 and secondary heat exchanger 16. The used ram air is then dumped overboard through ram air outlet 22.

Compressed air from air intake 12 is ducted to primary heat exchanger 14 where it is cooled with the ram air that is pulled across primary heat exchanger 14 with ram air fan 20. The cooled air from primary heat exchanger 14 then flows to air cycle machine 24. Air cycle machine 24 includes compressor 26, first turbine 28, and second turbine 30 that are all mounted to shaft 32. Ram air fan 20 also forms a part of air cycle machine 24 and is mounted to shaft 32. The cooled air from primary heat exchanger 14 first flows through compressor 26 of air cycle machine 24 from compressor inlet 26A to compressor outlet 26B. Compressor 26 includes a compressor rotor mounted to shaft 32 that is rotated with shaft 32 to further compress the air flowing through compressor 26 of air cycle machine 24. The compressed air from compressor 26 then flows to secondary heat exchanger 16 where it is further cooled with ram air that is pulled across secondary heat exchanger 16.

The cooled air from secondary heat exchanger 16 then flows through a duct to reheater 34 and condenser 36. Reheater 34 mixes the cooled air with recirculated air from the aircraft cabin to heat the cooled air. Condenser 36 condenses the cooled air by lowering the air temperature. The reheated and condensed air then flows through a duct to water collector 38, which collects the condensed water out of the air. The air then flows from water collector 38 back through reheater 34. Air from reheater 34 then flows through first turbine 28 of air cycle machine 24 from first turbine inlet 28A to first turbine outlet 28B. First turbine 28 also includes a first turbine rotor mounted on shaft 32. Energy is extracted from the air expanding through first turbine 28 of air cycle machine 24 to drive shaft 32.

Air from first turbine 28 then flows back through condenser 36. Air from condenser 36 then flows through second turbine 30 of air cycle machine 24 from second turbine inlet 30A to second turbine outlet 30B. Second turbine 30 also includes a second turbine rotor mounted on shaft 32. Energy is extracted from the air expanding through second turbine 30 of air cycle machine 24 to drive shaft 32. Air from second turbine 30 then flows out of air cycle machine 24 to be delivered to the aircraft cabin.

Environmental control system 10 also includes a plurality of temperature and pressure sensors, as is well known in the art. The plurality of temperature and pressure sensors have been omitted from FIG. 1 for clarity. Environmental control system 10 further includes control valves located throughout environmental control system 10.

Environmental control system 10 also includes a plurality of isolation valves, including first turbine bypass shutoff valve 50, second turbine bypass shutoff valve 52, and compressor bypass valve 54. First turbine bypass shutoff valve 50 is positioned adjacent to first turbine inlet 28A of first turbine 28 in the duct that extends between reheater 34 and first turbine 28. First turbine bypass shutoff valve 50 is further connected to a duct that extends from first turbine bypass shutoff valve 50 to condenser 36. First turbine bypass shutoff valve 50 includes actuator 56 that can be actuated to shut off the flow of air from reheater 34 to first turbine 28. In a first position, first turbine bypass shutoff valve 50 allows air to flow from reheater 34 to first turbine 28. In a second position, first turbine bypass shutoff valve 50 will direct the air from reheater 34 to condenser 36. This will bypass first turbine 28 completely.

Second turbine bypass shutoff valve 52 is positioned adjacent to second turbine inlet 30A of second turbine 30 in the duct that extends between condenser 36 and second turbine 30. Second turbine bypass shutoff valve 52 is further connected to a duct that extends from second turbine bypass shutoff valve 52 to the duct that delivers conditioned air to the aircraft cabin. Second turbine bypass shutoff valve 52 includes actuator 58 that can be actuated to shut off the flow of air from condenser 36 to second turbine 30. In a first position, second turbine bypass shutoff valve 52 allows air to flow from condenser 36 to second turbine 30. In a second position, second turbine bypass shutoff valve 52 will direct the air from condenser 36 to the aircraft cabin. This will bypass second turbine 30 completely.

Compressor bypass valve 54 is positioned between two ducts, a first duct that extends from primary heat exchanger 14 to compressor 26 and a second duct that extends between compressor 26 and secondary heat exchanger 16. This allows air to flow through compressor bypass valve 54 to bypass compressor 26. Compressor bypass valve 54 is a pressure valve. As the pressure of the air flowing from primary heat exchanger 14 to compressor 26 changes, compressor bypass valve 54 can be opened to allow the air from primary heat exchanger 14 to bypass compressor 26 and flow to secondary heat exchanger 16.

Together, first turbine bypass shutoff valve 50, second turbine bypass shutoff valve 52, and compressor bypass valve 54 can shut off the flow of air through air cycle machine 24. This can be beneficial when there is a failure of either the bearings supporting the rotors or an individual rotor in air cycle machine 24. A rotor failure will often cause air being delivered to the aircraft cabin to have a smell or smoke will be visible in the air. Air that has the presence of smoke or a smell due to a failure in air cycle machine 24 is not dangerous, but it is often a cause for an emergency landing as there is no way to determine if the smell or the smoke in the cabin air is due to a failure in air cycle machine 24 or due to a more serious or dangerous problem. Thus, having a way to completely bypass air cycle machine 24 to determine whether air cycle machine 24 is the source of a smell or smoke will reduce the frequency of having to make an emergency landing due to a smell or smoke in the cabin air due to a failure in air cycle machine 24.

First turbine bypass shutoff valve 50 and second turbine bypass shutoff valve 52 can be actuated in two ways. First, a pack controller for environmental control system 10 can sense the presence of an abnormality in the air flowing through air cycle machine 10 and can send a signal to automatically actuate actuator 56 of first turbine shutoff valve 50 and actuator 58 of second turbine bypass shutoff valve 52. Second, a pilot can detect the presence of a smell or smoke in the cabin air and manually actuate a switch in the cockpit to send a signal to actuate actuator 56 of first turbine shutoff valve 50 and actuator 58 of second turbine bypass shutoff valve 52.

When first turbine bypass shutoff valve 50 and second turbine bypass shutoff valve 52 are in the second position, shaft 32 of air cycle machine 10 will stop rotating due to the fact that air will not be flowing through the first turbine rotor in first turbine 28 or the second turbine rotor in second turbine 30 to impart energy from the air to rotate shaft 32. Thus, compressor bypass valve 54 can be included so that air from primary heat exchanger 14 can bypass compressor 26 when shaft 32 of air cycle machine 10 is not rotating. Compressor bypass valve 54 is a pressure valve that will open due to a drop in pressure when the compressor rotor in compressor 26 is not rotating. Bypassing compressor 26 will allow the air in environmental control system 10 to maintain a sufficient pressure for delivery to the aircraft cabin, as the air will not lose pressure by flowing through a non-rotating compressor rotor.

If air cycle machine 24 is shut off during flight, an air cycle machine bearing cooling shutoff valve can also be used. The air cycle machine bearing cooling shutoff valve will shut off cooling air flowing across bearings in air cycle machine 24 when air cycle machine 24 is shut off. Further, a ram air valve can be situated adjacent primary heat exchanger 14 on ram air outlet 22. This allows ram air flowing across secondary heat exchanger 16 and primary heat exchanger 14 to exit environmental control system 10 so that the ram air flow does not power ram air fan 20 and thus causing rotation of shaft 32 of air cycle machine 24. Additionally, a fan bypass check valve can be included with a size that is great enough to reduce the flow of air through ram air fan 20 so that there is insufficient power to rotate shaft 32 of air cycle machine 24.

Utilizing first turbine bypass shutoff valve 50 and second turbine bypass shutoff valve 52 in air cycle machine 24 allows air cycle machine 24 to be shut down and/or bypassed completely when a failure is detected. Further, once an aircraft is in flight, the air that is being delivered to environmental control system 10 is at pressure that is suitable for use in the aircraft cabin. Further, air coming from ram air inlet 18 provides sufficient cooling for primary heat exchanger 14 and secondary heat exchanger 16 to cool the air to a temperature that is suitable for use in the aircraft cabin. Thus, air cycle machine 24 does not need to be used to condition air in-flight and can be bypassed using first turbine bypass shutoff valve 50, second turbine bypass shutoff valve 52, and compressor bypass valve 54. This will extend the life of air cycle machine 24, as it does not have to be run constantly in flight as is required with prior art environmental control systems.

Prior art environmental control systems commonly have a turbine bypass valve positioned adjacent to a turbine to direct a portion of the air to a turbine inlet and a portion of the air to a turbine outlet. This allows for control over the temperature of the air downstream of the turbine, as not all of the air flows through the turbine. First turbine bypass shutoff valve 50 and second turbine bypass shutoff valve 52 can eliminate the need for a turbine bypass valve, as first turbine bypass shutoff valve 50 and second turbine bypass shutoff valve 52 can be used to bypass a portion of the air to first turbine inlet 28A and second turbine inlet 30A, respectively, and a portion of the air to first turbine outlet 28B and second turbine outlet 30B, respectively. This is in addition to shutting down and bypassing air cycle machine 24 completely.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An environmental control system comprising:
    an air cycle machine comprising:
        a compressor section with a compressor inlet and a compressor outlet; and
        a first turbine section with a first turbine inlet and a first turbine outlet; and
    a first turbine bypass shutoff valve positioned adjacent to the first turbine inlet;
    wherein the first turbine bypass shutoff valve includes an actuator to actuate the first turbine bypass shutoff valve between a first position and a second position, wherein the actuator actuates the first turbine bypass shutoff valve between the first position and the second position in response to a command sent to the actuator;
    wherein in the first position, the first turbine bypass shutoff valve is configured to allow air to flow through the first turbine bypass shutoff valve into the first turbine inlet; and
    wherein in the second position, the first turbine bypass shutoff valve is configured to allow air to flow through the first turbine bypass shutoff valve to a second location.

2. The environmental control system of claim 1, wherein in the second position, the first turbine bypass shutoff valve is configured to allow air to flow through the first turbine bypass shutoff valve to a condenser to shut off the flow of air to the first turbine inlet.

3. The environmental control system of claim 1, and further comprising:
    a compressor bypass valve positioned adjacent to the compressor inlet, wherein the compressor bypass valve is a pressure valve, and wherein the compressor bypass valve is configured to allow air in the environmental control system to bypass the compressor section.

4. The environmental control system of claim 3, and further comprising:
    an air inlet to deliver air to the environmental control system, wherein the air is delivered to the environmental control system at a pressure that is suitable for use in an aircraft cabin; and
    a heat exchanger that is configured to condition the air that is delivered to the environmental control system, wherein the heat exchanger can condition the air to a temperature that is suitable for use in the aircraft cabin;
    wherein the air in the environmental control system can bypass the first turbine section with the first turbine bypass shutoff valve and the compressor section with the compressor bypass valve to bypass the air cycle machine to be delivered to the aircraft cabin.

5. The environmental control system of claim 1, wherein:
    the air cycle machine further comprises:
        a second turbine section with a second turbine inlet and a second turbine outlet; and
    the environmental control system further comprises:
        a second turbine bypass shutoff valve positioned adjacent to the second turbine inlet, wherein the second turbine bypass shutoff valve is configured to shut off the flow of air to the second turbine inlet.

6. The environmental control system of claim 5, wherein the second turbine bypass shutoff valve includes an actuator to actuate the second turbine bypass shutoff valve between a first position and a second position.

7. The environmental control system of claim 6, wherein in the first position, the second turbine bypass shutoff valve is configured to allow air to flow through the second turbine bypass shutoff valve into the second turbine inlet.

8. The environmental control system of claim 7, wherein in the second position, the second turbine bypass shutoff valve is configured to allow air to flow through the second turbine bypass shutoff valve to an aircraft cabin to shut off the flow of air to the second turbine inlet.

9. A method of shutting off flow to a turbine section in an air cycle machine in an environmental control system, the method comprising:
    flowing air through a first turbine bypass shutoff valve positioned at an inlet of a first turbine section in the air cycle machine to the first turbine inlet when the first turbine bypass shutoff valve is in a first position;
    detecting a failure in an air cycle machine;
    actuating an actuator of the first turbine bypass shutoff valve in response to a command to actuate the first turbine bypass shutoff valve from the first position to a second position;
    flowing air through the first turbine bypass shutoff valve to a second location when the first turbine bypass shutoff valve is in the second position; and
    shutting off the flow of air to the first turbine section in the air cycle machine.

10. The method of claim 9, wherein the command to actuate the first turbine bypass shutoff valve is from a pack controller.

11. The method of claim 9, wherein the command to actuate the first turbine shutoff valve is from a switch positioned in a cockpit.

12. The method of claim 9, and further comprising:
    receiving air into the environmental control system through an air inlet, wherein the air is received at a pressure that is suitable for use in an aircraft cabin;
    conditioning the air with a heat exchanger, wherein the air is conditioned to a temperature that is suitable for use in the aircraft cabin;
    bypassing a compressor section in the air cycle machine with a compressor bypass valve in response to a drop in pressure of the air in the air cycle machine when the flow of air to the first turbine section is shut off; and bypassing the air cycle machine to deliver the air in the environmental control system to the aircraft cabin.

13. The method of claim 9, and further comprising:

flowing air through a second turbine bypass shutoff valve positioned at an inlet of a second turbine section in the air cycle machine to the second turbine inlet when the second turbine bypass shutoff valve is in a first position;

actuating the second turbine bypass shutoff valve from the first position to a second position;

flowing air through the second turbine bypass shutoff valve to a second location when the second turbine bypass shutoff valve is in the second position; and shutting off the flow of air to the second turbine section in the air cycle machine.

14. An environmental control system comprising:
an air cycle machine comprising:
a compressor section with a compressor inlet and a compressor outlet;
a first turbine section with a first turbine inlet and a first turbine outlet; and
a second turbine section with a second turbine inlet and a second turbine outlet;
a first turbine bypass shutoff valve positioned adjacent to the first turbine inlet, wherein the first turbine bypass shutoff valve is configured to shut off the flow of air to the first turbine inlet; and
a second turbine bypass shutoff valve positioned adjacent to the second turbine inlet, wherein the second turbine bypass shutoff valve is configured to shut off the flow of air to the second turbine inlet.

15. The environmental control system of claim 14, wherein the first turbine bypass shutoff valve includes an actuator to actuate the first turbine bypass shutoff valve between a first position and a second position.

16. The environmental control system of claim 15, wherein in the first position, the first turbine bypass shutoff valve is configured to allow air to flow through the first turbine bypass shutoff valve into the first turbine inlet.

17. The environmental control system of claim 16, wherein in the second position, the first turbine bypass shutoff valve is configured allow air to flow through the first turbine bypass shutoff valve to a condenser to shut off the flow of air to the first turbine inlet.

18. The environmental control system of claim 14, and further comprising:
a compressor bypass valve positioned adjacent to the compressor inlet, wherein the compressor bypass valve is a pressure valve, and wherein the compressor bypass valve is configured to allow air in the environmental control system to bypass the compressor section.

19. The environmental control system of claim 18, and further comprising:
an air inlet to deliver air to the environmental control system, wherein the air is delivered to the environmental control system at a pressure that is suitable for use in an aircraft cabin; and a heat exchanger that is configured to condition the air that is delivered to the environmental control system, wherein the heat exchanger can condition the air to a temperature that is suitable for use in the aircraft cabin;

wherein the air in the environmental control system can bypass the first turbine section with the first turbine bypass shutoff valve and the compressor section with the compressor bypass valve to bypass the air cycle machine to be delivered to the aircraft cabin.

20. The environmental control system of claim 14, wherein the second turbine bypass shutoff valve includes an actuator to actuate the second turbine bypass shutoff valve between a first position and a second position.

21. The environmental control system of claim 20, wherein in the first position, the second turbine bypass shutoff valve is configured to allow air to flow through the second turbine bypass shutoff valve into the second turbine inlet.

22. The environmental control system of claim 21, wherein in the second position, the second turbine bypass shutoff valve is configured to allow air to flow through the second turbine bypass shutoff valve to an aircraft cabin to shut off the flow of air to the second turbine inlet.

23. A method of shutting off flow to a turbine section in an air cycle machine in an environmental control system, the method comprising:
detecting a failure in an air cycle machine;
actuating a first turbine bypass shutoff valve positioned at an inlet of a first turbine section in the air cycle machine;
shutting off a flow of air to the first turbine section in the air cycle machine;
actuating a second turbine bypass shutoff valve positioned at an inlet of a second turbine section in the air cycle machine; and
shutting off a flow of air to the second turbine section in the air cycle machine.

24. The method of claim 23, wherein actuating the first turbine bypass shutoff valve can include actuating the first turbine bypass shutoff valve due to a command from a pack controller.

25. The method of claim 23, wherein actuating the first turbine bypass shutoff valve can include actuating the bypass shutoff valve in response to a command from a switch positioned in a cockpit.

26. The method of claim 23, and further comprising:
receiving air into the environmental control system through an air inlet, wherein the air is received at a pressure that is suitable for use in an aircraft cabin;
conditioning the air with a heat exchanger, wherein the air is conditioned to a temperature that is suitable for use in the aircraft cabin;
bypassing a compressor section in the air cycle machine with a compressor bypass valve in response to a drop in pressure of the air in the air cycle machine when the flow of air to the first turbine section is shut off; and
bypassing the air cycle machine to deliver the air in the environmental control system to the aircraft cabin.

* * * * *